(12) United States Patent
Tsai et al.

(10) Patent No.: US 7,654,687 B2
(45) Date of Patent: Feb. 2, 2010

(54) LIGHT MIXER AND BACKLIGHT MODULE HAVING THE SAME

(75) Inventors: Shen-Yin Tsai, Tainan (TW);
Chin-Lung Kuo, Tainan (TW);
Yao-Yuan Kuo, Tainan (TW); I-Chang Lee, Tainan (TW)

(73) Assignee: Chi Lin Technology Co., Ltd., Tainan County (TW)

( * ) Notice: Subject to any disclaimer, the term of this patent is extended or adjusted under 35 U.S.C. 154(b) by 241 days.

(21) Appl. No.: 11/714,827

(22) Filed: Mar. 7, 2007

(65) Prior Publication Data
US 2008/0137335 A1 Jun. 12, 2008

(30) Foreign Application Priority Data
Dec. 6, 2006 (TW) ............................... 95145404 A

(51) Int. Cl.
*F21V 9/08* (2006.01)
(52) U.S. Cl. .................. 362/237; 362/231; 362/246; 362/97.3; 257/98; 349/62
(58) Field of Classification Search ............. 362/97, 362/231, 237, 240, 246; 257/89, 98; 349/61, 349/62
See application file for complete search history.

(56) References Cited

U.S. PATENT DOCUMENTS

| | | | |
|---|---|---|---|
| 5,249,104 A * | 9/1993 | Mizobe | 362/605 |
| 6,404,131 B1 * | 6/2002 | Kawano et al. | 362/245 |
| 6,964,497 B2 * | 11/2005 | Greiner | 362/241 |
| 7,063,430 B2 * | 6/2006 | Greiner | 362/30 |
| 7,222,993 B2 * | 5/2007 | Kikuchi et al. | 362/300 |
| 7,441,913 B2 * | 10/2008 | Bayersdorfer | 362/29 |
| 7,458,714 B2 * | 12/2008 | Chang | 362/626 |
| 2002/0097578 A1 | 7/2002 | Greiner | |
| 2005/0259195 A1 | 11/2005 | Koganezawa | |
| 2006/0013002 A1 * | 1/2006 | Coushaine et al. | 362/308 |
| 2006/0262538 A1 * | 11/2006 | Li et al. | 362/296 |
| 2007/0086179 A1 * | 4/2007 | Chen et al. | 362/27 |
| 2007/0147073 A1 * | 6/2007 | Sakai et al. | 362/607 |

* cited by examiner

*Primary Examiner*—Ismael Negron
(74) *Attorney, Agent, or Firm*—Volentine & Whitt, PLLC

(57) ABSTRACT

A light mixer includes a light mixing plate, a plurality of light sources, a plurality of upper reflecting layers, a lower reflecting layer, and a semi-permeable layer. The light mixing plate has an upper surface, a lower surface, a peripheral surface, and a plurality of receiving holes. The light sources are respectively located in the receiving holes. The upper reflecting layers are respectively located right above the light sources. The lower reflecting layer is located on the lower surface of the light mixing plate. The semi-permeable layer wraps the peripheral surface of the light mixing plate. A diffuser is located above the light mixers.

33 Claims, 6 Drawing Sheets

LIGHT MIXER AND BACKLIGHT MODULE HAVING THE SAME

BACKGROUND OF THE INVENTION

1. Field of the Invention

The present invention relates to a light mixer and a backlight module having the light mixer. More particularly, the present invention relates to a modularized light mixer and a backlight module having the light mixer.

2. Description of the Related Art

FIG. 1 is a schematic top view of a conventional backlight module disclosed in US Patent No. US 2005/0259195A1 with a diffuser omitted. FIG. 2 is a schematic cross-sectional view of FIG. 1. The conventional backlight module includes a diffuser (not shown), a reflector 10, and a plurality of light guide blocks 20.

The light guide blocks 20 are arranged in an array and fixed on the reflector 10, and the light guide blocks 20 are spaced apart from each other by an appropriate distance. Each light guide block 20 includes a light guide body 21, a receiving space 22, and four LEDs 23, 24, 25, and 26. The light guide body 21 is made of an acrylate resin for the lights to penetrate through, and the light guide body 21 is a cylinder-shaped ring, with the receiving space 22 formed therein. The receiving space 22 is an air layer for receiving the LEDs 23, 24, 25, and 26. The LED 23 is for emitting red lights. The LED 24 is for emitting green lights. The LED 25 is for emitting green lights. The LED 26 is for emitting blue lights.

With the above structure, the lights emitted by the LEDs 23, 24, 25, and 26 may be mixed into a white light in the air layer of the receiving space 22 and then emitted outwards. However, since the LEDs 23, 24, 25, and 26 naturally mix the light in the air, the light mixing efficiency is not high, so the overall thickness of the conventional backlight module cannot be effectively reduced. In addition, the amount of LEDs required by the conventional backlight module cannot be effectively reduced, which not only consumes a lot of power, but also raises the fabricating cost.

Therefore, it is necessary to provide a light mixer and a backlight module having the light mixer to solve the above problems.

SUMMARY OF THE INVENTION

The objective of the present invention is to provide a backlight module, which comprises a plurality of light mixers and a diffuser. The light mixers are arranged on a plane in an array. Each light mixer comprises a light mixing plate, a plurality of light sources, a plurality of upper reflecting layers, a lower reflecting layer, and a semi-permeable layer. The light mixing plate has an upper surface, a lower surface, a peripheral surface, and a plurality of receiving holes. The light sources are respectively located in the receiving holes. The upper reflecting layers are respectively located right above the light sources. The lower reflecting layer is located on the lower surface of the light mixing plate. The semi-permeable layer wraps the peripheral surface of the light mixing plate. The diffuser is located above the light mixers.

The backlight module is formed by the modularized light mixers, without requiring a large light guide plate used in the prior art, and thus can be conveniently fabricated; the fabricating process is relatively simple, the fabricating cost is relatively low, and it is simple and convenient to maintain. Furthermore, the special design of the light mixers may improve the light mixing efficiency and the luminance, so that the area of the light mixing plate reaches 50 mm*50 mm, and even up to 120 mm*120 mm, and thus the amount of the light mixers in the backlight module can be reduced, and accordingly, the amount of the light sources is reduced.

DETAILED DESCRIPTION OF THE INVENTION

Figure 1:
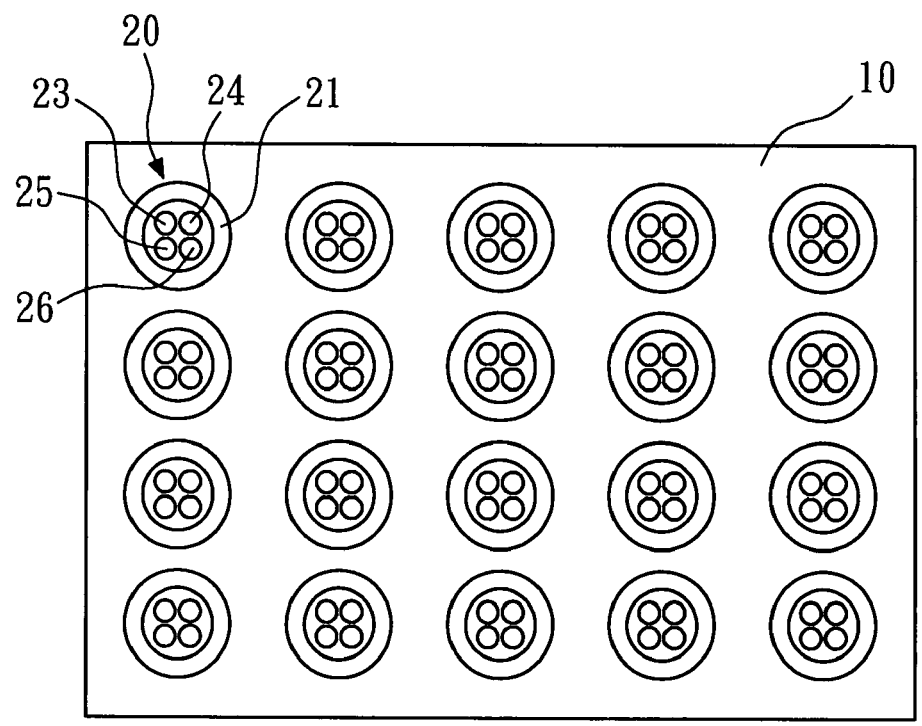
FIG. 1 is a schematic top view of a conventional backlight module disclosed in US Patent No. US2005/0259195A1 with a diffuser omitted.
Figure 2:
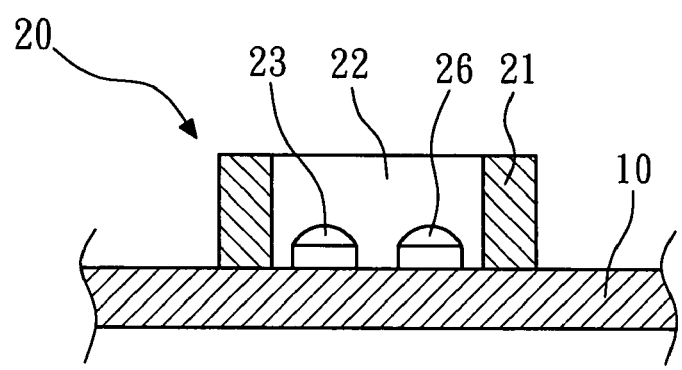
FIG. 2 is a schematic cross-sectional view of FIG. 1.
Figure 3:
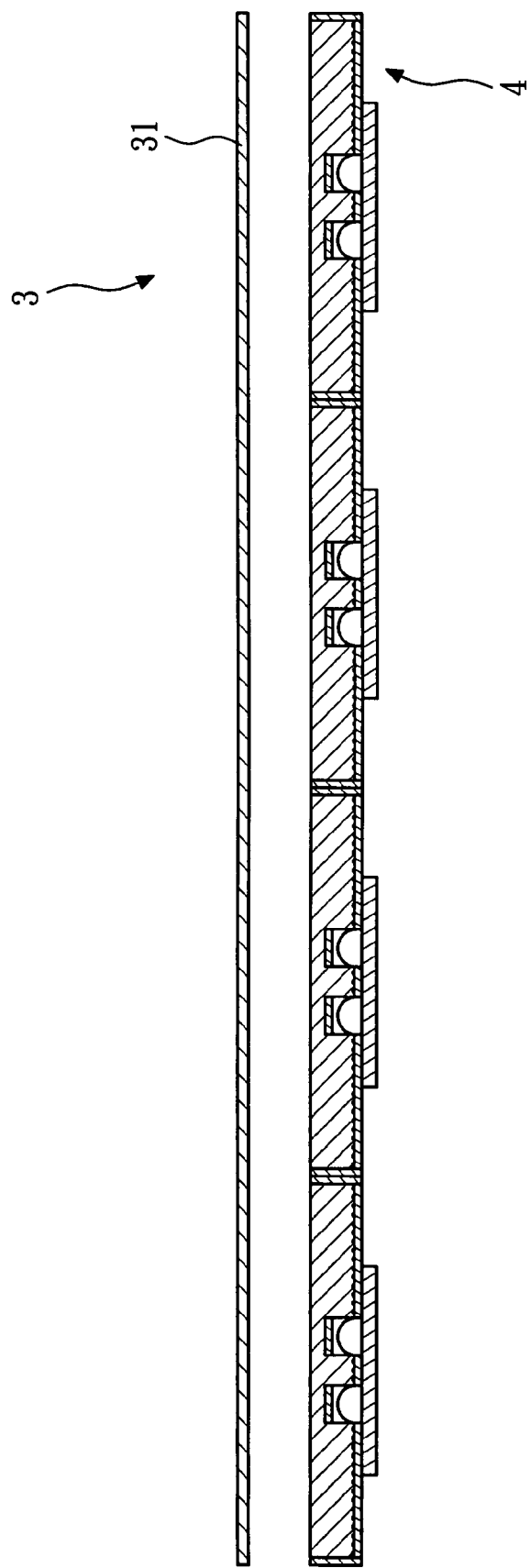
FIG. 3 is a schematic cross-sectional view of a backlight module according to a first embodiment of the present invention.
Figure 4:
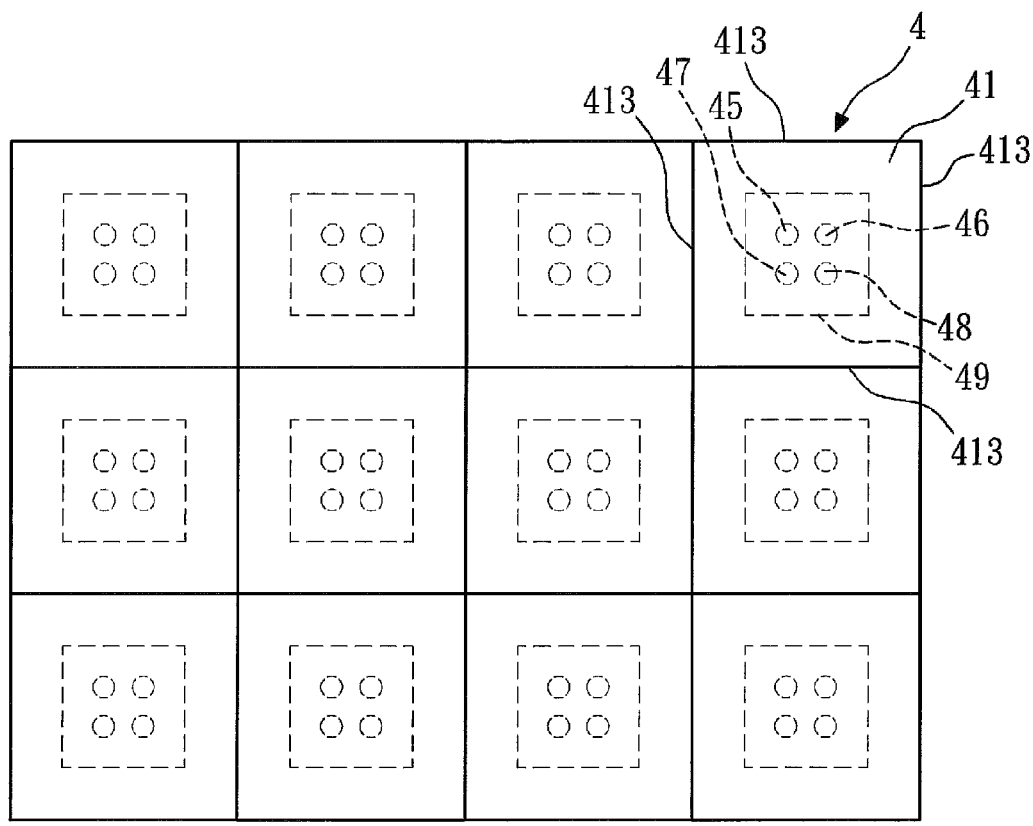
FIG. 4 is a schematic top view of the backlight module of the first embodiment of the present invention with a diffuser omitted.

FIG. 3 is a schematic cross-sectional view of a backlight module according to a first embodiment of the present invention. FIG. 4 is a schematic top view of the backlight module according to the first embodiment of the present invention with a diffuser omitted. The backlight module 3 includes a plurality of light mixers 4 and a diffuser 31. The light mixers 4 are arranged adjacent to each other as an array on a plane. The diffuser 31 is located above the light mixers 4. The light mixers 4 are preferably spaced apart from the diffuser 31 for an appropriate distance, and a plurality of optical films (not shown) is adhered on the diffuser 31, so as to increase the optical effect.

Figure 5:
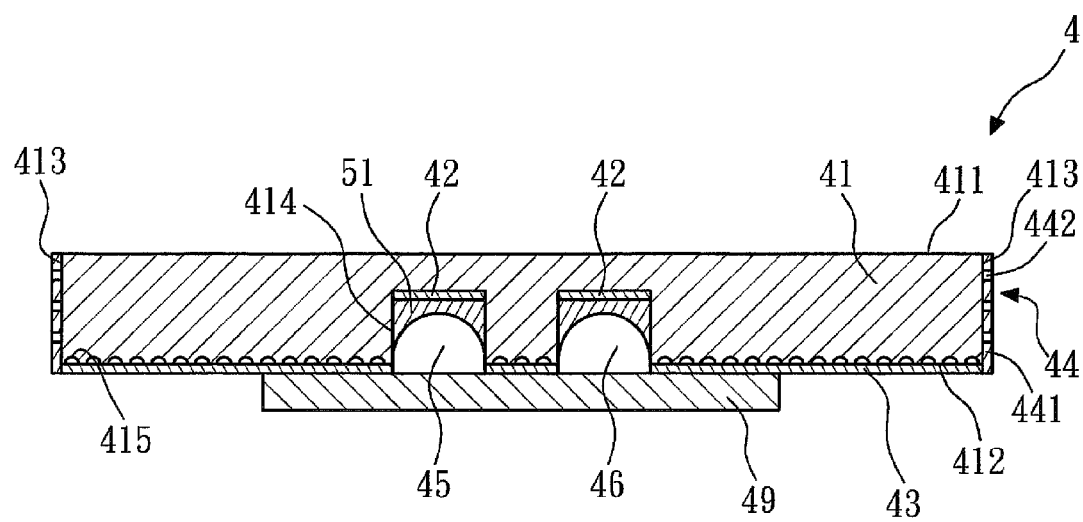
FIG. 5 is a schematic cross-sectional view of a light mixer according to the first embodiment of the present invention.

FIG. 5 is a schematic cross-sectional view of a light mixer according to the first embodiment of the present invention. The light mixer 4 includes a light mixing plate 41, a plurality of light sources, a plurality of upper reflecting layers 42, a lower reflecting layer 43, and a semi-permeable layer 44. The light mixing plate 41 has an upper surface 411, a lower surface 412, a peripheral surface 413, and a plurality of receiving holes 414. The light mixing plate 41 is made of a material selected from a group consisting of polymethyl methacrylate (PMMA), polycarbonate (PC), cyclo olefin copolymer (COC), polystyrene (PS), glass, and a mixture thereof. The light mixing plate 41 is preferably a light guide plate. In this embodiment, the light mixing plate 41 is a cube structure with a uniform thickness, the upper surface 411 and the lower surface 412 are both planes and parallel to each other, and the upper surface 411 is a light-emitting surface. The peripheral surface 413 of the light mixing plate 41 has four sides. It is to be understood that the light mixing plate 41 may also be a triangle, pentagram, or another polygon shape when viewed from the top.

In this embodiment, the lower surface 412 of the light mixing plate 41 has a structure for making a total internal reflection disappear, for example, a printing pattern or a microstructure 415. The microstructure 415 is bumpy with periodical or unperiodical repetitiveness, for refracting and diffusing the light in the light mixing plate 41, so as to enhance the light mixing effect. The type of the microstructure 415 includes, but is not limited to, a plurality of recesses or projections arranged parallel to each other or crossed with each other, and the external shape of the recesses or the projections are circular arc, square, trapezoid, triangle, or another shape. In other applications, the lower surface 412 of the light mixing plate 41 has a printing pattern with the same function as that of the microstructure 415. In addition, the upper surface 411 of the light mixing plate 41 may also have the microstructure 415 or the printing pattern.

In this embodiment, the receiving holes 414 are blind holes, the light sources are four LEDs 45, 46, 47, and 48, and each LED is respectively located in one receiving hole 414. The LEDs 45, 46, 47, and 48 are located on a substrate 49. The LED 45 is for emitting red lights. The LED 46 is for emitting green lights. The LED 47 is for emitting green lights. The LED 48 is for emitting blue lights. However, in other applications, the number of the LEDs may be three or five.

The upper reflecting layers 42 are respectively located right above the light sources. In this embodiment, the upper reflecting layer 42 is located within a wall of the receiving hole 414, which is respectively located right above each LED. The upper reflecting layer 42 is used to reflect the upward lights of the LEDs 45, 46, 47, and 48 into the light mixing plate 41 to be mixed. It is understood that the upper reflecting layers 42 may also be located at a position corresponding to the receiving holes 414 on the upper surface 411 of the light mixing plate 41. In addition, preferably, the light mixer 4 further includes a plurality of optical materials 51 located between each LED and each upper reflecting layer 42 respectively, that is, the optical materials 51 fill in the remaining space of the receiving holes 414, so as to enhance the optical properties.

The lower reflecting layer 43 is located on the lower surface 412 of the light mixing plate 41, in order to reflect the lights emitted by the LEDs 45, 46, 47, and 48 into the light mixing plate 41 to be mixed. The semi-permeable layer 44 wraps the peripheral surface 413 of the light mixing plate 41 in order to reflect a part of the lights emitted by the LEDs 45, 46, 47, and 48 into the light mixing plate 41 to be mixed. The transmittance of the semi-permeable layer 44 is 30% to 100%, and preferably 35% to 99%, so as to prevent part of the light from passing through, and thus, the mura phenomenon between two light mixers 4 is eliminated, and the lights emitted by the light mixers 4 become more uniform. Preferably, the semi-permeable layer 44 includes an opaque portion 441 and a plurality of through holes 442 for part of the light emitted by the plurality of light sources to pass therethrough.

The backlight module 3 is formed by modularized light mixers 4, without requiring a large-sized light guide plate in the prior art, and thus can be conveniently fabricated; the fabricating process is relatively simple, and the fabricating cost is relatively low. In addition, due to the modularized design, the maintenance of the backlight module 3 is relatively simple and convenient. Furthermore, the special design of the light mixers 4 can enhance the light mixing efficiency and the luminance, so that the area of the light mixing plate 41 reaches 50 mm*50 mm, and even up to 120 mm*120 mm, and thus the amount of the light mixers 4 in the backlight module 3 may be reduced, and the amount of the LEDs is reduced accordingly. In addition, it is understood that, when the light mixers 4 are arranged in an array to form the backlight module 3, the light mixers 4 may not need the semi-permeable layer 44. The reason is that an air layer exists between the light mixers 4, and when the light enters the air layer from the light mixing plate 41, the refraction and the total reflection occur, so as to increase the light mixing effect.

Figure 6:
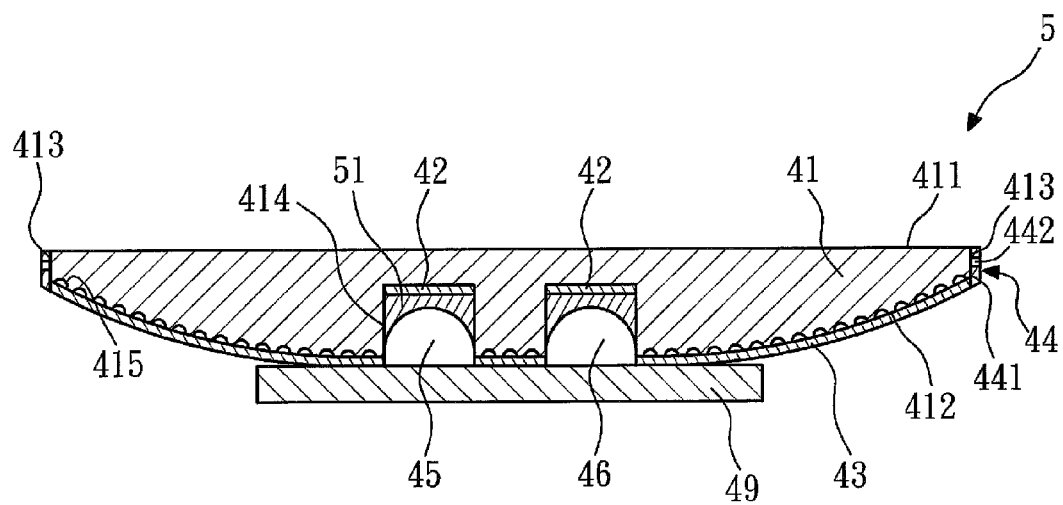
FIG. 6 is a schematic cross-sectional view of a light mixer according to a second embodiment of the present invention.

FIG. 6 is a schematic cross-sectional view of a light mixer according to a second embodiment of the present invention. The light mixer 5 of this embodiment is substantially the same as the light mixer 4 (FIG. 5) of the first embodiment, and the same numerals are assigned to the same elements. The only difference between the light mixer 5 of this embodiment and the light mixer 4 of the first embodiment lies in that, in this embodiment, the light mixing plate 41 has a non-uniform thickness, the upper surface 411 is a plane, and the lower surface 412 is a free-form surface. It is understood that the lower surface 412 of the light mixing plate 41 may also be a curve a chamfer, that is, the lower surface 412 is not parallel to the upper surface 411, so as to form a pyramidal surface.

Figure 7:
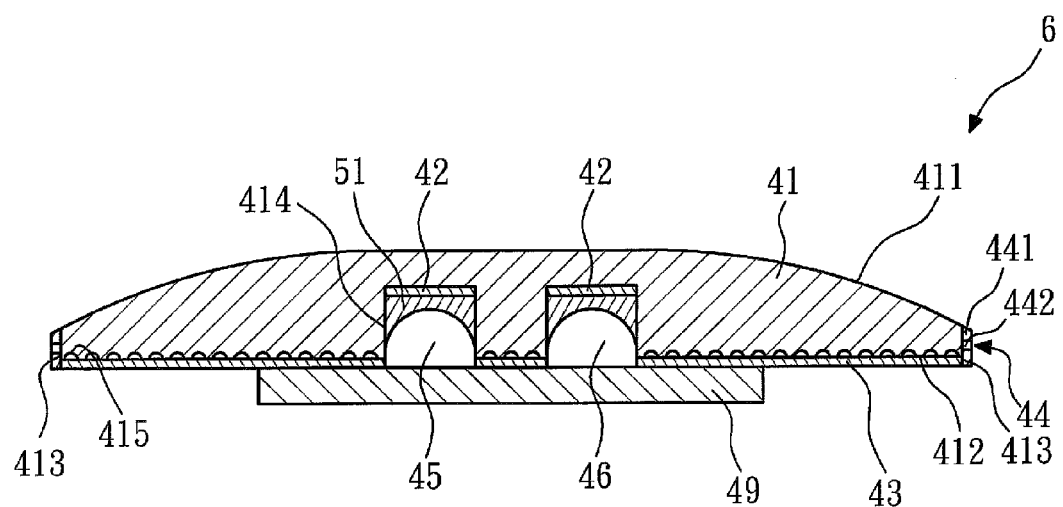
FIG. 7 is a schematic cross-sectional view of a light mixer according to a third embodiment of the present invention.

FIG. 7 is a schematic cross-sectional view of a light mixer according to a third embodiment of the present invention. The light mixer 6 of this embodiment is substantially the same as the light mixer 4 (FIG. 5) of the first embodiment, and the same numerals are assigned to the same elements. The difference between the light mixer 6 of this embodiment and the light mixer 4 of the first embodiment lies in that, in this embodiment, the light mixing plate 41 has a non-uniform thickness, the upper surface 411 is a free-form surface, and the lower surface 412 is a plane.

Figure 8:
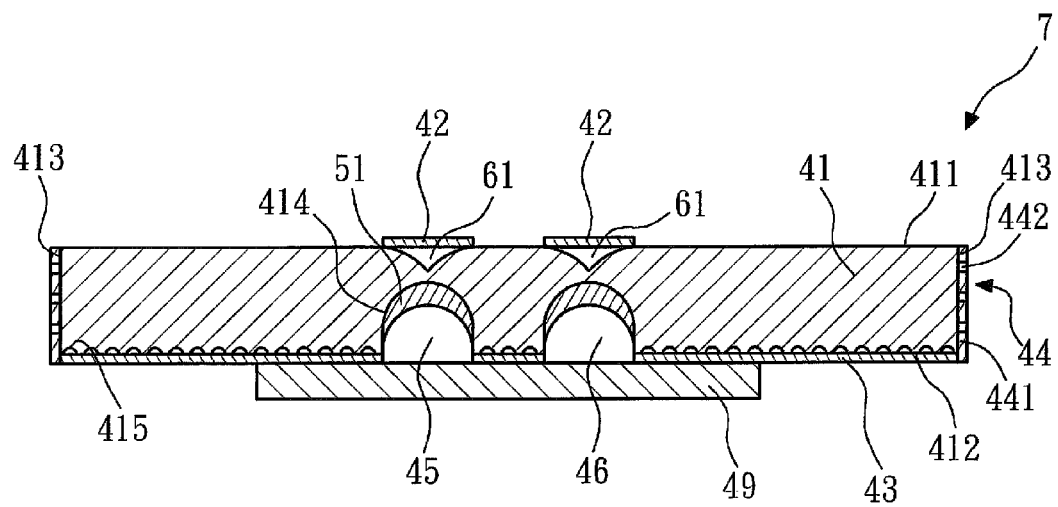
FIG. 8 is a schematic cross-sectional view of a light mixer according to a fourth embodiment of the present invention.

FIG. 8 is a schematic cross-sectional view of a light mixer according to a fourth embodiment of the present invention. The light mixer 7 of this embodiment is substantially the same as the light mixer 4 (FIG. 5) of the first embodiment, and the same numerals are assigned to the same elements. The difference between the light mixer 7 of this embodiment and the light mixer 4 of the first embodiment lies in that, in this embodiment, the upper surface 411 of the light mixing plate 41 has a recess hole 61 at a position corresponding to each receiving hole 414, and the recess holes 61 are used to reflect the upward lights of the LEDs 45, 46, 47, and 48 into the light mixing plate 41 to be mixed.

Figure 9:
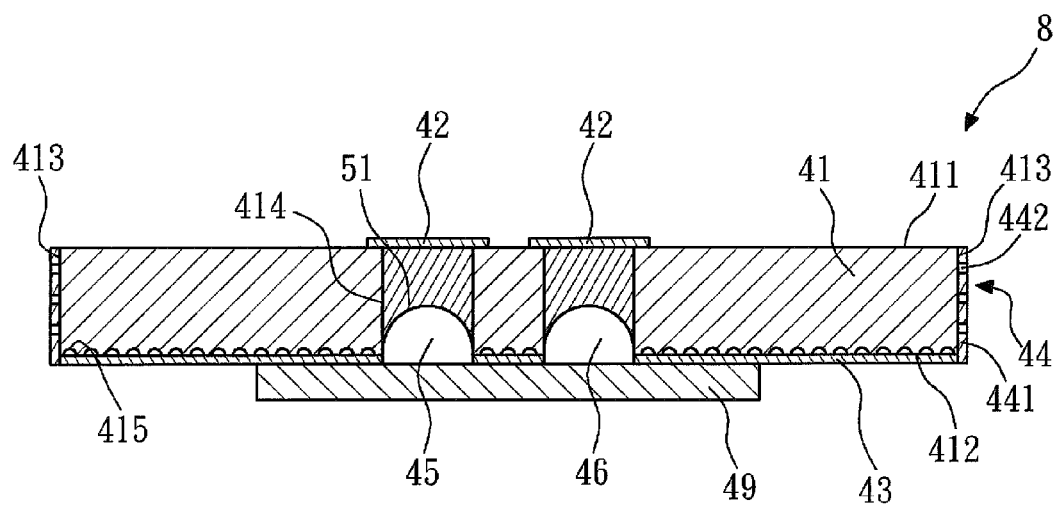
FIG. 9 is a schematic top view of a light mixer according to a fifth embodiment of the present invention.

FIG. 9 is a schematic cross-sectional view of a light mixer according to a fifth embodiment of the present invention. The light mixer 8 of this embodiment is substantially the same as the light mixer 4 (FIG. 5) of the first embodiment, and the same numerals are assigned to the same elements. The difference between the light mixer 8 of this embodiment and the light mixer 4 of the first embodiment lies in that, in this embodiment, the receiving holes 414 are through holes, and the upper reflecting layers 42 are located at positions on the upper surface 411 of the light mixing plate 41 corresponding to the receiving holes 414.

Figure 10:
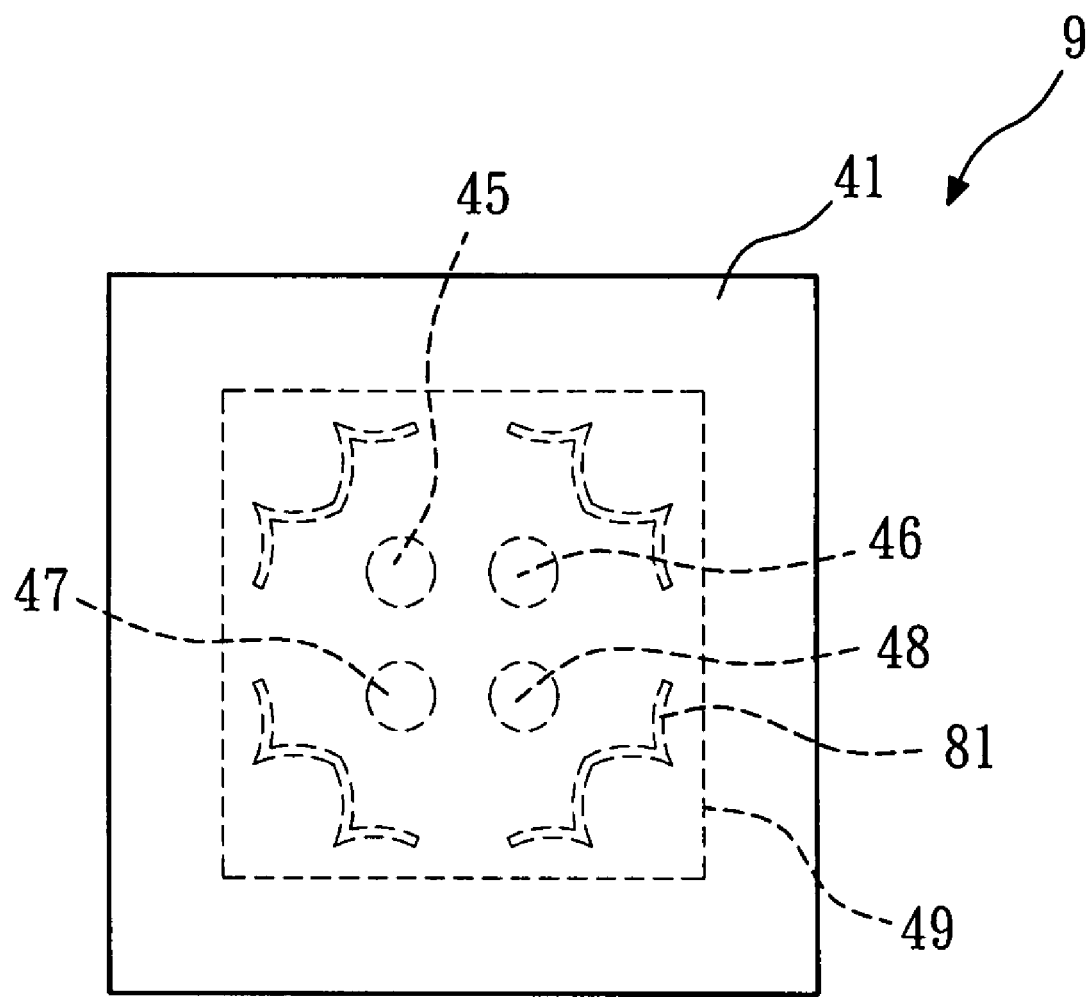
FIG. 10 is a schematic top view of a light mixer according to a sixth embodiment of the present invention.

FIG. 10 is a schematic top view of a light mixer according to a sixth embodiment of the present invention. The light mixer 9 of this embodiment is substantially the same as the light mixer 4 (FIG. 5) of the first embodiment, and the same numerals are assigned to the same elements. The difference between the light mixer 9 of this embodiment and the light mixer 4 of the first embodiment lies in that, in this embodiment, the light mixing plate 41 further includes a plurality of scattering holes 81 located at the periphery of the receiving holes 414. The scattering holes 81 may be through holes or blind holes, and preferably, irregular shaped, for diffusing or scattering the lights emitted by the LEDs 45, 46, 47, and 48.

The following examples are used to give a detailed description of the present invention, which does not mean the present invention is limited to the examples.

EXAMPLE 1

Twenty-eight light mixers 7 (FIG. 8) of the fourth embodiment of the present invention are arranged into a 4*7 array, and the process for arranging LEDs in each light mixer 7 is described as follows. LED 45 is the red LED, LED 46 is the green LED, LED 47 is the green LED, and LED 48 is the blue LED. Next, a color brilliance meter is used for measurement at 50 cm from the light mixers 50, and the measuring results are listed as follows. (1) When the reflectance of the semi-permeable layer 44 is 100%, the luminance is 4200 nit, the luminance uniformity is 77.2%, and the color uniformity is 0.022. (2) When the reflectance of the semi-permeable layer 44 is 50%, the luminance is. 4277.56 nit, the luminance uniformity is 82.35%, and the color uniformity is 0.023. (3) When the reflectance of the semi-permeable layer 44 is 0%, the luminance is 4342.84 nit, the luminance uniformity is 88.37%, and the color uniformity is 0.031.

EXAMPLE 2

Twenty-eight light mixers 7 (FIG. 8) of the fourth embodiment of the present invention are arranged into a 4*7 array, and the process for arranging LEDs in each light mixer 7 is described as follows. LED 45 is the blue LED, LED 46 is the green LED, LED 47 is the green LED, and LED 48 is the red LED. The reflectance of the semi-permeable layer 44 of each light mixer 7 is 0%. Next, a color brilliance meter is used for measurement at 50 cm from the light mixers 50, and the measuring results are listed as follows: the luminance is 4332.74 nit, the luminance uniformity is 86.78%, and the color uniformity is 0.011.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. A light mixer, comprising:
    a light mixing plate, having an upper surface, a lower surface, a peripheral surface, and a plurality of receiving holes;
    a plurality of light sources, located in the receiving holes respectively;
    a lower reflecting layer, located on the lower surface of the light mixing plate; and
    a semi-permeable layer, wrapping the peripheral surface of the light mixing plate, the semi-permeable layer comprising an opaque portion and a plurality of through holes for part of the light emitted by the plurality of light sources to pass therethrough.

2. The light mixer as claimed in claim 1, wherein the light mixing plate has a uniform thickness, and the upper surface and the lower surface are both planes.

3. The light mixer as claimed in claim 1, wherein the receiving holes of the light mixing plate are through holes.

4. The light mixer as claimed in claim 1, wherein the lower surface of the light mixing plate has a structure for making a total internal reflection disappear.

5. The light mixer as claimed in claim 1, wherein the upper surface of the light mixing plate has a structure for making a total internal reflection disappear.

6. The light mixer as claimed in claim 1, wherein the light mixing plate further comprises a plurality of scattering holes located at the periphery of the receiving holes.

7. The light mixer as claimed in claim 1, wherein the transmittance of the semi-permeable layer is 30% to 100%.

8. The light mixer as claimed in claim 1, wherein the light mixing plate has a non-uniform thickness.

9. The light mixer as claimed in claim 8, wherein the upper surface of the light mixing plate is a plane, and the lower surface of the light mixing plate is a free-form surface.

10. The light mixer as claimed in claim 1, wherein the receiving holes of the light mixing plate are blind holes.

11. The light mixer as claimed in claim 10, wherein the upper surface of the light mixing plate has a recess hole at a position corresponding to each receiving hole.

12. The light mixer as claimed in claim 1, further comprising a plurality of upper reflective layers, located right above the light sources respectively.

13. The light mixer as claimed in claim 12, further comprising a plurality of optical materials located between each light source and each upper reflecting layer respectively.

14. A backlight module, comprising:
    a plurality of light mixers, arranged on a plane in an array, wherein each of the light mixers comprises:
    a light mixing plate, having an upper surface, a lower surface, a peripheral surface, and a plurality of receiving holes;
    a plurality of light sources, located in the receiving holes respectively;
    a lower reflecting layer, located on the lower surface of the light mixing plate; and
    a semi-permeable layer, wrapping the peripheral surface of the light mixing plate, the semi-permeable layer comprising an opaque portion and a plurality of through holes for part of the light emitted by the plurality of light sources to pass therethrough; and
    a diffuser, located above the light mixers.

15. The backlight module as claimed in claim 14, wherein the light mixers are spaced apart from the diffuser for a suitable distance.

16. The backlight module as claimed in claim 14, wherein the light mixing plate of the light mixer has a uniform thickness, and the upper surface and the lower surface are both planes.

17. The backlight module as claimed in claim 14, wherein the receiving holes of the light mixing plate of the light mixer are through holes.

18. The backlight module as claimed in claim 14, wherein the lower surface of the light mixing plate of the light mixer has a structure for making a total internal reflection disappear.

19. The backlight module as claimed in claim 14, wherein the upper surface of the light mixing plate of the light mixer has a structure for making a total internal reflection disappear.

20. The backlight module as claimed in claim 14, wherein the light mixing plate of the light mixer further comprises a plurality of scattering holes located at the periphery of the receiving holes.

21. The backlight module as claimed in claim 14, wherein the transmittance of the semi-permeable layer of the light mixer is 30% to 100%.

22. The backlight module as claimed in claim 14, wherein the light mixing plate of the light mixer has a non-uniform thickness.

23. The backlight module as claimed in claim 22, wherein the upper surface of the light mixing plate of the light mixer is a plane, and the lower surface of the light mixing plate is a free-form surface.

24. The backlight module as claimed in claim 14, wherein the receiving holes of the light mixing plate of the light mixer are blind holes.

25. The backlight module as claimed in claim 24, wherein the upper surface of the light mixing plate of the light mixer has a recess hole at a position corresponding to each receiving hole.

26. The backlight module as claimed in claim 14, further comprising a plurality of upper reflective layers, located right above the light sources respectively.

27. The backlight module as claimed in claim 26, wherein the light mixer further comprises a plurality of optical materials located between each light source and each upper reflecting layer respectively.

28. A light mixer, comprising:
a light mixing plate, having an upper surface, a lower surface, a peripheral surface, and a plurality of receiving holes, wherein the receiving holes are blind holes, and the upper surface of the light mixing plate has a recess hole at a position corresponding to each receiving hole;
a plurality of light sources, located in the receiving holes respectively;
a lower reflecting layer, located on the lower surface of the light mixing plate; and
a semi-permeable layer, wrapping the peripheral surface of the light mixing plate, the semi-permeable layer comprising an opaque portion and a plurality of through holes for part of the light emitted by the plurality of light sources to pass therethrough.

29. The light mixer as claimed in claim 28, wherein the light mixing plate has a uniform thickness, and the upper surface and the lower surface are both planes.

30. The light mixer as claimed in claim 28, wherein the lower surface of the light mixing plate has a structure for making a total internal reflection disappear.

31. The light mixer as claimed in claim 28, wherein the light mixing plate further comprises a plurality of scattering holes located at the periphery of the receiving holes.

32. The light mixer as claimed in claim 28, further comprising a plurality of upper reflective layers, located right above the light sources respectively.

33. The light mixer as claimed in claim 28, wherein the transmittance of the semi-permeable layer is 30% to 100%.

* * * * *